United States Patent
Davis, Jr. et al.

(10) Patent No.: US 6,364,394 B1
(45) Date of Patent: Apr. 2, 2002

(54) WIRE HARNESS RETAINER

(75) Inventors: Joseph J. Davis, Jr., Ortonville; Jack S. Palazzolo, Dearborn, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/516,434

(22) Filed: Mar. 1, 2000

Related U.S. Application Data

(60) Provisional application No. 60/149,323, filed on Aug. 17, 1999.

(51) Int. Cl.⁷ .................................................. B62D 25/14
(52) U.S. Cl. ...................................... 296/70; 296/203.01
(58) Field of Search .............................. 296/70, 203.01, 296/208

(56) References Cited

U.S. PATENT DOCUMENTS

| | | |
|---|---|---|
| 4,416,497 A | 11/1983 | Brandsness et al. |
| 4,650,925 A | 3/1987 | Coldren |
| 4,815,984 A | 3/1989 | Sugiyama et al. |
| 5,324,203 A | 6/1994 | Sano et al. |
| 5,460,530 A | 10/1995 | Toba et al. |
| 5,549,344 A | 8/1996 | Nishijima et al. |
| 5,735,041 A | 4/1998 | Zaguskin et al. |
| 5,856,908 A | 1/1999 | Takiguchi et al. |
| 5,877,936 A | 3/1999 | Nishitani et al. |

*Primary Examiner*—Stephen T. Gordon
*Assistant Examiner*—Scott Carpenter
(74) *Attorney, Agent, or Firm*—Brooks & Kushman P.C.

(57) ABSTRACT

An instrument panel for use in a vehicle is disclosed. The instrument panel has a cross-car beam which provides structural support for the instrument panel and a retainer for securing a wire harness to the cross-car beam. The present invention provides a means to easily secure a wire harness to an instrument panel. Moreover, the retainer shields the wire harness thereby protecting the wire harness from damage.

18 Claims, 1 Drawing Sheet

WIRE HARNESS RETAINER

CROSS-REFERENCE TO RELATED APPLICATION

This application claims the benefit of U.S. Provisional Application Ser. No. 60/149,323, filed Aug. 17, 1999.

TECHNICAL FIELD

The present invention relates to wire harnesses and to means for retaining wire harnesses in a desired configuration within an instrument panel.

BACKGROUND ART

Instrument panels for automobiles will generally include a plurality of electrical devices. For example, such electrical devices may include a speedometer gauge, temperature gauges, fuel level gauge, radios, heaters, a.c. units, and lights. In order to power these electronic devices a wire harness must be packaged within the instrument panel. Generally, a wire harness is packaged longitudinally across the instrument panel and pigtails extend from the wire harness to the electrical device to be powered.

The retainment of the wire harness in a instrument panel is a significant concern. Prior art solutions utilize clips and tape to affix the wire harness against the instrument panel. While these prior device and methods for retaining the wire harness to the instrument panel work for their intended purpose other problems arise. For example, over time through the vibration of the vehicle the clips and tape loosen and a buzz, squeak or rattle occurs. Additionally, the prior art devices and methods used to retain the wire harness are labor intensive and costly since additional parts are required to secure the harness to the instrument panel.

Accordingly, a new and improved wire harness retainer is needed for holding a wire harness adjacent to an instrument panel. Such a new and improved wire harness retainer should eliminate buzzes, squeaks and rattles, as well as reduce the total number of parts required to retain the wire harness against the instrument panel.

DISCLOSURE OF INVENTION

Accordingly, an object of the present invention is to provide a wire harness retainer for fixing a wire harness to an instrument panel.

In accordance with this and other objects, the present invention provides an instrument panel for use in a vehicle. The instrument panel has a cross car beam which provides structural support for the instrument panel and a retainer for securing a wire harness to the cross car beam. The present invention provides a means to easily secure a wire harness to an instrument panel. Moreover, the retainer shields the wire harness thereby protecting the wire harness from damage.

In accordance with another aspect of the present invention the wire harness is preferably a flat copper cable.

In accordance with still another aspect of the present invention the retainer is integrally molded with the cross car beam.

In accordance with still another aspect of the present invention the cross car beam further comprises a front panel and a back panel.

In accordance with still another aspect of the present invention the retainer is integrally molded with the front panel of the cross car beam.

In accordance with still another aspect of the present invention the retainer further comprises a longitudinal shelf portion upon which the wire harness is disposed.

In accordance with still another aspect of the present invention the retainer further comprises a flap portion for shielding the wire harness.

In accordance with still another aspect of the present invention the flap portion further comprises a clip portion for removably securing the flap portion to the shelf.

In accordance with still another aspect of the present invention the retainer further comprises a living hinge for allowing the flap portion to rotate with respect to the shelf portion.

In accordance with yet another aspect of the present invention an instrument panel for use in a vehicle is provided. The instrument panel has a cross car beam for providing structural support to the instrument panel and a retainer affixed to the cross car beam for securing a wire harness thereto. The retainer includes a flap portion connected to a shelf portion by a living hinge for encapsulating the wire harness and protecting the wire harness from damage.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
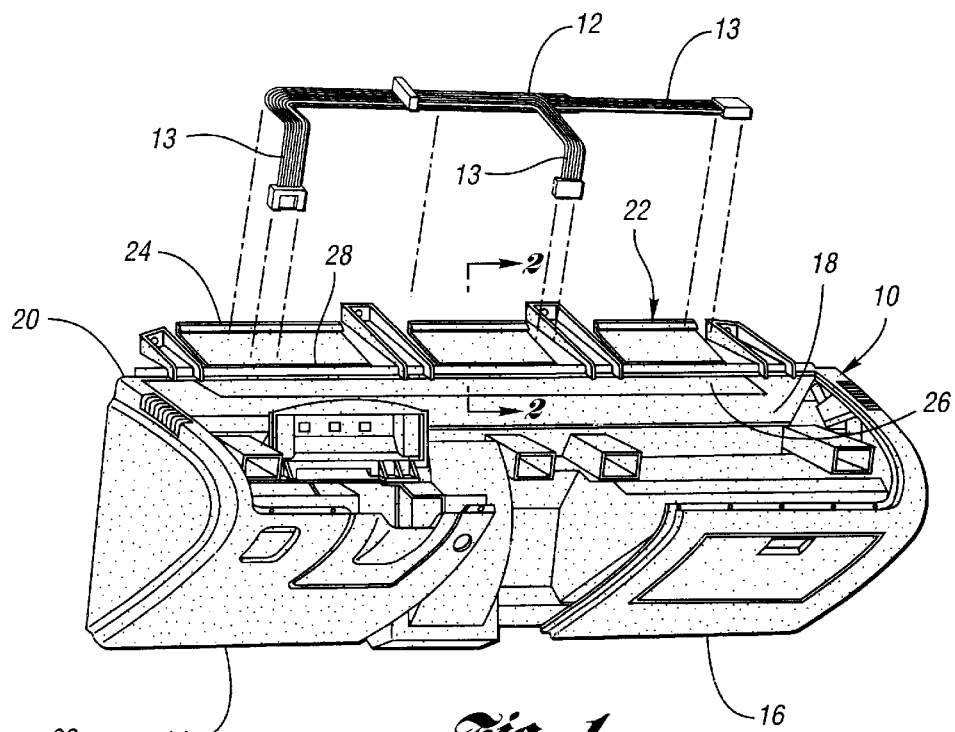
FIG. 1 is a perspective view of an instrument panel configured to attach to an interior of an automobile and having a wire harness retainer for securing a wire harness thereto, in accordance with the present invention.

Referring now to FIG. 1, an instrument panel 10 is illustrated. Instrument panel 10 is configured to attach to an interior of an automobile and houses a plurality of electrical components. For example, speedometer gauges, temperature gauges, convenience lights, cigarette lighter, radio, speakers, are all accommodated within the instrument panel. In order to connect these electrical components to the wire harness 12, wire harness 12 is disposed longitudinally across the instrument panel and has a plurality of pigtails 13 extending from the wire harness for connecting to each electrical component. More specifically, wire harness 12 runs from the driver side 14 to the passenger side 16 of the instrument panel 10.

Instrument panel 10 includes a cross-car beam 18 which provides structural support for the instrument panel. Generally, the cross-car beam runs across the entire width of a vehicle and is fastened to the vehicle side structure. Typically, the cross-car beam is comprised of a front panel 20 and a rear panel 30 which will be illustrated in subsequent figures.

Front panel 20 is shown in FIG. 1 having an integrally molded wire harness retainer 22 Wire harness retainer 22 is comprised of a flap portion 24 and a shelf portion 26. Preferably, both shelf portion 26 and flap portion 24 are integrally molded with the front panel 20. During the molding process a living hinge 28 is formed between the flap portion 24 and the shelf portion 26. Living hinge 28 allows the flap portion to rotate and overlay the shelf portion 26. Shelf portion 26 is so dimensioned to accommodate wire harness 12, and in cooperation with flap portion 24 securely fixes the wire harness 12 to the cross-car beam 18.

Front panel 20 including wire harness retainer 22 is, preferably, comprised of ABS plastic with poly-carbonate or an equivalent engineered resin or engineered thermoplastic having a low glass content. Such engineered plastics are available from Dow Chemical and are sold under the brand name Puls. In order for living hinge 28 to operate properly and not break an appropriate resilient engineering plastic as specified above must be selected.

Figures 2, 3:
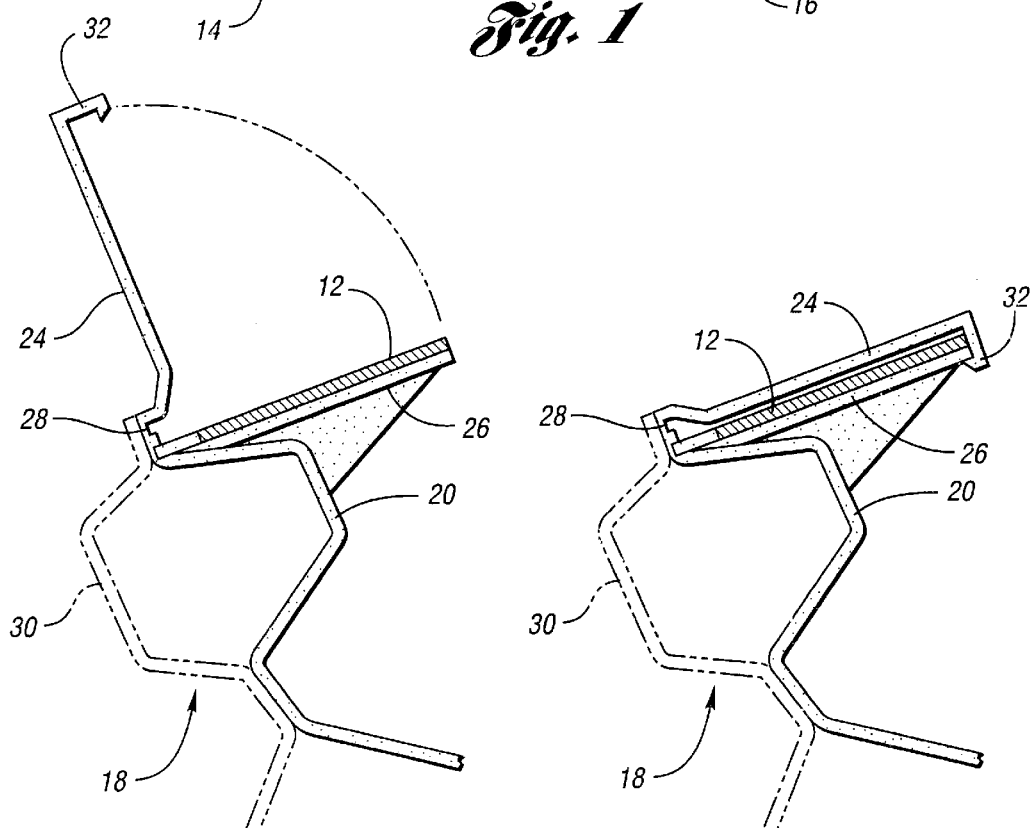
FIG. 2 is a cross section through the cross-car beam, the flap portion and the shelf portion of the wire harness retainer, wherein the flap portion is shown in an open position, in accordance with the present invention.
FIG. 3 is a cross sectional view through the cross-car beam, the flap portion and the shelf portion of the wire harness retainer, wherein the flap portion is shown in a closed position, in accordance with the present invention.

Referring now to FIG. 2, a cross section through the cross-car beam 18, the flap portion 24 and the shelf portion 26 is illustrated, in accordance with the present invention. As shown in FIG. 2, cross-car beam 18 has a rear panel 30 which is secured to the front panel 20 to create a generally box shaped cross-section. Flap portion 24 is shown in an open position for receiving wire harness 12. Further, flap portion 24 includes a clip end 32 which is configured to engage shelf portion 26.

In operation, wire harness 12 is loaded onto shelf portion 26 and flap portion 24 is rotated downward bending at living hinge 28. Further rotation of flap portion 24 results in engagement of the clip end 32 with shelf portion 26.

Referring now to FIG. 3, flap portion 24 is shown in a closed position, in accordance with the present invention. When flap portion 24 is rotated to the fully closed position the clip end 32 engages a front edge 34 of shelf 26. As shown, the engagement of clip end 32 with front edge 34 prevents movement of the wire harness with respect to cross-car beam 18. Moreover, flap portion 24 and shelf portion 26 together form a shield which not only retains wire harness 12 but also prevents objects from contacting wire harness 12 and damaging same.

Since retainer 22 is preferably integrally molded into front panel 20 additional fasteners are not required to retain or secure wire harness 12 to the cross-car beam 18. This reduces costs of assembly, as well as reduces parts costs, reduces warranty costs, and squeaks and rattles caused by two contacting parts moving relative to each other.

Other benefits and advantages of the present invention over the prior art are readily apparent from the above disclosure of the invention. For example, the present invention eliminates wire harness fasteners by integrating the wire harness retainer into the plastic injection mold for the cross-car beam. Consequently, assembly costs and assembly time is reduced. Furthermore, wire harness retainer 22 of the present invention reduces buzzes, squeaks, and rattles by eliminating relative movement of the wire harness with respect to the cross-car beam. Additionally, retainer 22 shields the wire harness 12 from other objects which may come in contact with the wire harness and cause damage to same.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An instrument panel for use in a vehicle, comprising:
   a cross-car beam that extends substantially the entire width of the vehicle for providing structural support for the instrument panel, the cross-car beam being affixed to the instrument panel and attachable to side structure of the vehicle; and
   a retainer integrally molded to the cross-car beam for securing a wire harness thereto.

2. The instrument panel of claim 1, wherein the wire harness is a flat copper cable.

3. The instrument panel of claim 1, wherein the cross-car beam further comprises a front panel and a back panel.

4. The instrument panel of claim 3, wherein the retainer is integrally molded to the front panel.

5. The instrument panel of claim 1, wherein the retainer further comprises a longitudinal shelf portion upon which the wire harness is disposed.

6. The instrument panel of claim 5, wherein the retainer further comprises a flap portion for shielding the wire harness.

7. The instrument panel of claim 6, wherein the flap portion further comprises a clip portion for removably securing the flap to the shelf.

8. The instrument panel of claim 1, wherein the retainer further comprises a living hinge for allowing the flap portion to rotate with respect to the shelf portion.

9. The instrument panel of claim 1, wherein the retainer is comprised of ABS plastic with ploy-carbonate.

10. An instrument panel for use in a vehicle, comprising:
    a cross-car beam that extends substantially the entire width of the vehicle for providing structural support for the instrument panel, the cross-car beam being affixed to the instrument panel and attachable to side structure of the vehicle; and
    a retainer integrally molded to the cross-car beam for securing a wire harness thereto, wherein the retainer has a flap portion connected to a shelf portion by a living hinge.

11. The instrument panel of claim 10, wherein the wire harness is a flat copper cable.

12. The instrument panel of claim 10, wherein the cross car beam further comprises a front panel and a back panel.

13. The instrument panel of claim 12, wherein the retainer is integrally molded to the front panel.

14. The instrument panel of claim 10, wherein the flap portion further comprises a clip portion for removably securing the flap portion to the shelf portion.

15. The instrument panel of claim 10, wherein the retainer is comprised of an engineered resin plastic having a low glass content.

16. The instrument panel of claim 15, wherein the engineered resin plastic is an ABS plastic with poly-carbonate.

17. The instrument panel of claim 10, wherein the retainer is comprised of an engineered thermoplastic having a low glass content.

18. The instrument panel of claim 17, wherein the engineered thermoplastic is comprised of an ABS plastic with poly-carbonate.

* * * * *